July 31, 1973 D. G. MICKLEWRIGHT 3,749,647
APPARATUS FOR STRIPPING SOLVENT FROM AND DEHYDRATING TRIMELLITIC
ACID CONTENT OF FLUID EFFLUENT FROM CATALYTIC
LIQUID PHASE OXIDATION OF PSEUDOCUMENE
IN PRESENCE OF ACETIC ACID
Filed Dec. 7, 1970 2 Sheets-Sheet 2

Fig. 2

INVENTOR.
Donald G. Micklewright
BY Fred R Ahlers
ATTORNEY

United States Patent Office 3,749,647
Patented July 31, 1973

3,749,647
APPARATUS FOR STRIPPING SOLVENT FROM AND DEHYDRATING TRIMELLITIC ACID CONTENT OF FLUID EFFLUENT FROM CATALYTIC LIQUID PHASE OXIDATION OF PSEUDOCUMENE IN PRESENCE OF ACETIC ACID
Donald G. Micklewright, Crown Point, Ind., assignor to Standad Oil Company, Chicago, Ill.
Filed Dec. 7, 1970, Ser. No. 95,659
Int. Cl. B01d 3/20, 3/26
U.S. Cl. 202—153                     6 Claims

ABSTRACT OF THE DISCLOSURE

Carryover of trimellitic acid or its intramolecular acid anhydride with stripped solvent and reflux of stripped solvent to dehydration of trimellitic acid are avoided by conduct of said stripping and dehydrating in a combination of (a) solvent stripping tower comprising a bottom reflux trap out zone, a solvent vaporizing zone, a solvent scrubbing zone, a solvent stripping zone and a dephlegmating zone and (b) a dehydration drum with hot reflux (knock-back) condenser and reboiler arranged to provide solvent vapors from dehydration drum to said scrubbing zone of said tower and one portion of liquid bottoms reflux from said trap out zone to dehydration drum and a second portion of liquid bottoms reflux to solvent vaporizing zone.

Background of the invention

Figure 1:
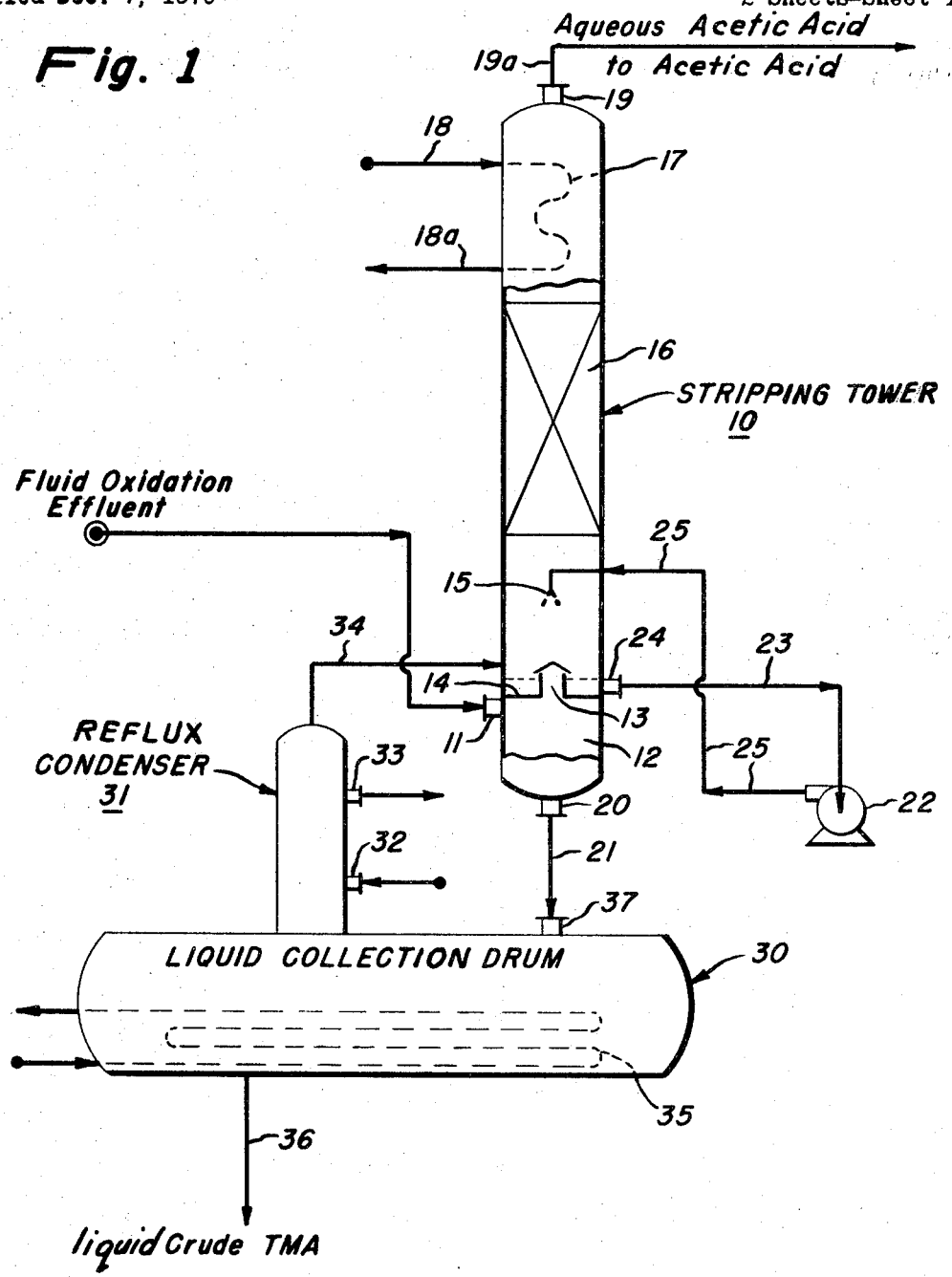

Trimellitic acid can be readily prepared by catalytic liquid phase oxidation of pseudocumene with molecular oxygen (e.g. air or oxygen gas) in the presence of acetic acid solvent. For highest single pass through one or more oxidation vessels for conversion of pseudocumene to trimellitic acid there is used the catalysis provided according to U.S. Pat. No. 2,833,816 by one or more heavy metal oxidation catalysts (e.g. acetic acid soluble salts of Co, Mn, Ce and mixtures thereof) in combination with bromine or a source of bromine (e.g. sodium bromide, ammonium bromide, hydrogen bromide, tetrabromoethane, benzyl bromide and of two or more mixtures thereof). Such catalytic liquid phase oxidation has been developed to provide at a final temperature of 400–425° F. and pressure of 340–380 pounds per square inch gauge (p.s.i.g.) from the use of 3–5 weight parts of acetic acid containing 0–5 weight percent water for each part by weight of pseudocumene a fluid oxidation effluent which contains for each 100 parts by weight of acetic acid solvent 135–160 parts by weight of trimellitic acid and 5–15 parts by weight of aromatic oxygen-containing by- and co-product impurities such as iso- and terephthalic acids; methylphthalic acids; formylphthalic acids; phenyl, bromophenyl and hydroxyphenyl esters of benzoic, phthalic and trimellitic acid, polyanhydrides of trimellitic acid phthalic acid bromophthalic acid, bromobenzoic acid, hydroxybenzoic acid and compounds having the structure of benzil, fluorenone and anthraquinone wherein one of the benzene rings is unsubstituted or has carboxy, bromo, or hydroxy substituents; as well as aromatic acid salts of the metal components of the catalyst system.

Trimellitic acid (TMLA) is quite soluble in the acetic acid solvent portion of the fluid oxidation effluent even at crystallization temperatures of 50–100° F. conveniently obtainable in commercial operations. Because of such solubility characteristics 30–35% of the TMLA in the fluid oxidation effluent remains dissolved in the acetic acid mother liquor after separation of the first crop of TMLA crystalline product. Further crops of TMLA can be obtained by several successive concentrations of mother liquor and TMLA crystallizations. However, the additional TMLA crystalline crops increase in impurity content and must, in general, be separately processed before combining with the first TMLA crop for conversion to its intramolecular acid anhydride, trimellitic acid anhydride, hereafter TMA.

Trimellitic acid, a tribasic acid, is an exceptionally useful starting material. Many of the uses of TMLA depend upon reaction of one or two of its carboxylic acid groups in a selective manner differing from the reaction of its other carboxylic acid group or groups. For such purposes it is advantageous to use TMLA in its intramolecular acid anhydride (TMA) form because of the recognized difference in reactivity between the anhydride group and the free carboxylic acid group. The reactivity of the free carboxylic acid group can be modified, for example made more reactive than the anhydride group by converting the free carboxylic acid group to an acid halide, e.g. acid chloride, group. Thus it is preferred to recover TMLA as TMA from the fluid oxidation effluent. Also the TMA form of TMLA is better suited for purification because crude TMA can be fractionated under subatmospheric pressures suitably of 1–100, desirably 1–50 and preferably 1–20 mm. Hg.

Several processes have been devised and disclosed for the recovery of high quality (95–99%) TMA by avoiding TMLA crystallization from fluid oxidation effluent. These processes, in general, comprise one, two or more distillations of fluid oxidation effluent and its liquid residue. The first distillation removes aqueous acetic acid solvent which can contain 3–25 percent water on a weight basis. Such removed aqueous acetic acid contains water initially charged with acetic acid solvent to the oxidation. Such water amounts to 3–5 weight percent of the initial oxidation solvent. The remainder of the water (6–25%) in the aqueous solvent in the fluid oxidation effluent is oxidation by-product water formed by the conversion of the three methyl groups to carboxylic acid groups and competing co-reactions which provide some of the ester and polyanhydride impurities. Some TMLA (85–100%) can be converted to TMA during such removal of aqueous acetic acid solvent by distillation conducted at a bottom temperature of 300–575° F. and pressure from 200–800 mm. Hg or by flash stripping conducted at 350–425° F. while depressuring fluid oxidation effluent from 340–380 to a pressure of from atmosperic pressure to 50 p.s.i.g. and a temperature of 300–400° F. When not more than 70–90% of the TMLA is dehydrated to TMA by such distillation or flash stripping, the liquid residue is further heated, e.g. by addition to a pool of liquid crude TMA at 350–450° F., desirably at subatmospheric pressure of 10–50 mm. Hg, to complete dehydration of TMLA to TMA.

The liquid crude TMA residue of the fluid oxidation effluent now solvent and water free contains the aforementioned aromatic organic impurities and organic salts of the metal catalyst components. High quality TMA is recovered from said liquid crude TMA residue by subjecting it and major fractions thereof to one or more vacuum distillations and/or fractionations. Preference is indicated for a combination of three simple vacuum distillations wherein partially purified TMA containing impurities boiling below TMA is first removed from said liquid crude TMA at top vacuum of 10–20 mm. Hg. The partially purified TMA vapors are condensed and the condensate is used as feed to vacuum fractionation at top vacuum of 1–20 mm. Hg or to the first of two series connected simple distillation stages having short residence time of feed thereto, e.g. as short as in falling film distillation or evaporation. Such simple, short residence time vacuum distillations are conducted at 5–10 mm. Hg with liquid residue from the first stage used as feed to the second stage and vapors from each stage are combined to provide vaporized TMA product which is condensed. The condensate or filtrate thereof (suspended solid iso- and terephthalic acids carried forward by TMA vapors are removed by filtration when their removal is desired) is the high quality TMA product.

The prior practical applications of TMA recovery starting with distillation or flash stripping of aqueous acetic acid solvent from fluid oxidation effluent had the disadvantage of TMA vapors being swept out with aqueous acetic acid vapors even though said aqueous acetic acid vapors were first taken through a hot condenser. Since the removed aqueous acetic acid vapors were transferred to acetic acid concentration, e.g. removal of water by fractionation, the TMA swept out by aqueous acetic acid vapors could and did deposit as a solid in the vapor transfer line and in the fractionator wherein concentrated acetic acid was recovered. Such deposited solid TMA eventually caused substantially restricted flow and even stopped flow by plugging the vapor transfer line and/or restricted or plugged fluid and vapor flow in the fractionator.

By the present inventive combination of apparatus and its use in removing aqueous acetic acid from fluid oxidation effluent, the aforementioned problems and disadvantages are avoided.

Summary of invention

The present inventive combination of apparatus useful for removal of aqueous acetic acid solvent from and converting to TMA the TMLA content of fluid oxidation effluent comprises a combination of (a) a solvent stripping tower having bottom means for receiving a fluid mixture containing liquid and vapor and separating liquid from vapor, means for liquid reflux trap-out having at least one means for vapor transfer through trapped-out liquid, means for scrubbing rising vapors, means for rectification of scrubbed vapors, an internal dephlegmation means, a top vapor outlet and a bottom liquid outlet; (b) a liquid collection drum for collecting liquid from said liquid vapor separating means and having means for generating vapors, a reflux condenser for selective transfer of vapors to a point between said trap-out means and said scrubbing means and a liquid outlet; and (c) circulation means for removing trapped-out liquid and transfer of at least a portion of it to said scrubbing means and transfer of any remaining portion of it to said liquid-vapor separating means.

Preferably said combination also includes a means for indirect heat exchange between the fluid heat exchange materials hereafter mentioned and of said liquid-vapor mixture before its introduction into said liquid-vapor separating means. Said means for vapor generation in said liquid collection drum can be an internal indirect heat exchanger such as the surface of a heating jacket or an internal coil through which fluid heat exchange material such as hot liquid (e.g. oil or chlorinated bi- and terephenyl or eutectic mixture of diphenyl and diphenyl oxide boiling at a temperature of 258° C. and stable to 725° C. having a specific gravity of 1.060 (which electric mixture is the commercially available heat exchange material sold as Dowtherm), or superheated steam. Preferably said means for vapor generation is an external heat exchanger heated with the aforementioned fluid heat exchange material for indirect heat exchange with liquid transferred from the liquid outlet of said collection drum and returning thereto. Crude TMA is withdrawn from the heated liquid returning to the liquid collection drum.

Additional embodiments of said combination of apparatus will be described in relation to the accompanying drawing.

The drawings

The accompanying drawings are a schematic illustration of specific embodiments of the present inventive combination of apparatus.

FIG. 1 illustrates one specific embodiment of the present inventive combination of (a) solvent stripping tower 10, (b) liquid collection drum 30 and (c) circulating means 22.

Said solvent stripping tower 10 has bottom means 12 for receiving fluid mixture which is fluid oxidation effluent containing aqueous acetic acid solvent and TMLA via inlet 11 and separating liquid from vapor which passes up through vapor transfer chimney 13 in liquid trap-out 14 which can be a trap-out tray with a single vapor transfer chimney 13 as shown or two or three or more of such vapor transfer chimneys. Other known liquid trap-out devices functioning equivalently to said trap-out tray 14 with at least one vapor transfer through trapped-out liquid can also be used. Also within the space above trap-out tray 14 in said tower 10 is a vapor scrubber means shown as spray head 15. Above said space and in communication therewith is rectification means 16 which can be a section filled with formed sieves, ceramic or metal packing, sieve plates, bubble plates and the like known to usefully provide rectification as in distillation and fractionation. Above rectification means 16 and in communication therewith is the internal dephelgmation means 17 shown as an open omega loop but can also be a tube bundle or coil any of which are supplied cool heat transfer medium by inlet 18 which medium exist dephlegmation means 17 via outlet 18a. Said dephlegmation means 17 provides liquid reflux to rectification means 16 by condensing some of the vapors rising from rectification means 16. The residual vapors exit said tower 10 by vapor outlet 19. Liquid separated by bottom means 12 leave said tower 10 by liquid outlet 20 and flows via transfer line 21 by inlet 37 into liquid collection drum 30.

Circulation means shown as a pump 22 and conduits 23 and 25 withdraws trapped-out reflux liquid via suction line 23 from reflux outlet 24 and circulates reflux liquid via transfer line 25 to scrubbing means 15.

Liquid collection drum 30 has heating means 35 for generating vapors which leave collection drum 30 via reflux condenser 31 cooled by fluid heat transfer material, e.g. hot water, entering inlet 32 and exiting outlet 33. Reflux condenser 31 is operated to condense TMA vapors and return TMA to liquid collection drum. The remainder of the generated vapors are transferred back to tower 10 via vapor transfer 34 above trap-out tray 14. Said generated vapors are provided by any means for heating liquid in collection drum 30, for example by internal heating coil 35 as shown or by heating jacket not shown. Liquid crude TMA is withdrawn via liquid transfer line 36 from the liquid collection drum 30 for further processing by any process. Liquid collection drum 30 providing high quality TMA product and the heat supplied thereto for vapor generation should be sized with respect to separated liquid flowing via transfer line 21 to provide at least one hour residence time for liquid in collection drum 30.

FIG. II illustrates a further specific embodiment of the present inventive combination of (a) solvent stripping tower 10 (b) liquid collection drum 30 and (c) circulation means including as members pump 22.

The apparatus elements in FIG. II common to apparatus elements in FIG. 1 have identical reference numerals and will not further be described. But rather the equivalent uncommon apparatus and auxiliary apparatus therefor will be now described.

In this figure there is shown preferred means for enhancing the mixture of liquid and vapor feed to solvent stripping tower 10. This means comprises heater 40 wherein fluid heat exchange material of the types before mention enters inlet 41 and exists outlet 42 and by indirect heat exchange heats a mixture of liquid from discharge line 46 and fluid oxidation effluent entering feed inlet 43 and exists feed outlet 44. Fluid oxidation effluent leaving heater 40 is at a temperature and pressure greater than the temperature and pressure of the fluid oxidation effluent withdrawn from the oxidation reaction. Heated fluid oxidation effluent leaving feed outlet 44 of heater 40 flows via feed transfer line 45 into feed inlet 11 and bottom means 12 of solvent stripping tower 10.

Also shown is the preferred means for vapor generation in liquid collection drum 30. This means comprises reboiler 50 with its inlet 51 and outlet 52 to receive heat exchange material of the types before mentioned and discharge said material. Liquid collected in liquid collection drum is transferred by sump pump 38 by liquid transfer discharge line 38a into reboiler 50 via liquid inlet 53. Indirect heat exchange between said entering liquid and heat exchange material supplies heat for vapor generation in liquid collection drum 30 when the heated liquid exits reboiler 50 via liquid outlet 54 and flows via transfer conduits 55 and 56 back into liquid collection drum 30 via recycle inlet 39. Liquid crude TMA for further processing to recover high quality TMA is withdrawn by transfer conduit 57 from transfer conduit 55.

The additional features present in FIG. II just described provide the preferred specific embodiment of the inventive combination of apparatus for processing fluid oxidation effluent to remove therefrom aqueous acetic acid solvent vapors for solvent concentration, for example by fractionation not shown, and crude TMA product for recovery of high quality TMA product for example by one or more vacuum distillations also not shown. Preference is given to the combination of apparatus elements in FIG. II because sufficient additional heat above the sensible heat in the fluid oxidation effluent can be supplied by heater 40 to substantially vaporize all of the water and acetic acid in said effluent and by reboiler 50 to convert substantially all of the TMA content of the fluid oxidation effluent to TMA. Also stand-by replacement heater 40a (not shown) and stand-by replacement 50a (not shown) can be installed and by the appropriate use of pipe and valve arrangements be promptly placed into use when either of the first use heater 40 and/or reboiler 50 become plugged by deposits of TMA. In general, the combination of apparatus shown in FIG. I can be operated without substantial reduction of heat transfer in liquid collection drum 30 when 70-85% of the TMLA content of fluid oxidation effluent is converted to TMA. The crude TMA withdrawn from said drum 30 via transfer line 36 still contains some TMLA which must be converted to TMA before processing to obtain high quality TMA product to avoid decarboxylation of TMLA during such TMA product recovery.

The accompanying figures show a versatile solvent stripping system for recovering solvent from fluid effluent produced by liquid phase air oxidations of hydrocarbons especially such oxidation of pseudocumene to trimellitic acid (TMLA) and the further utility of supplying crude trimellitic anhydride (TMA) for recovery of high quality TMA product.

Generally, sufficient solvent is vaporized at relatively low temperature (250–300° F.) to bring the liquid in bottom means 12 to the point of incipient precipitation of solids. The vapor portion passes up through chimney 13 of trap-out tray 14 while the liquid drops into liquid collection drum 30.

For use of either combination of apparatus in FIGS. I and II, liquid collection drum is charged with liquid TMA or crude TMA. This pool of molten anhydride and by-products, containing essentially no solvent and does not accumulate any solvent during operation. The temperature of the pool is held at 400–500° F. to promote dehydration of TMLA and to avoid solvent accumulation during operation.

While operating with a molten pool in liquid collection drum 30, incoming acetic acid flashes off the surface, carrying with it a certain amount of higher boiling materials, e.g. TMA. Reflux (or knockback) condenser 31 is provided to reduce the amount of high boilers carried into the solvent stripper tower 10. The vapors are cooled to a temperature just above the freezing point of the higher boiling TMA and the condensate refluxes back into said drum 30. As an additional feature, solvent spray is provided by spray head 15 just above the inlet to the tower to further cool the vapors and knock down any entrained solids.

Overhead vapor from the solvent stripper tower 10 is piped directly to a solvent dehydration step. Reflux to said tower 10 is provided by the dephlegmation means 17. Sufficient reflux is supplied to assure that the concentration of high boilers entering tower 10 with the vapor generated in collection drum 30 does not exceed the solubility limit. This is done to avert the possibility of plugging in said tower 10. By collecting the reflux on the trap-out tray 14 and recycling it through heater 40 as shown in FIG. II, the amount of solvent entering the collection drum 30 is further minimized. This is especially desirable to reduce the carry-up of high boilers from liquid collection drum 30.

The use of the present inventive combination of apparatus will be described in the following example in relation to FIG. II and the processing of fluid oxidation effluent containing for each 100 pounds of aqueous acetic acid 160 pounds of trimellitic acid (TMLA) to recover crude TMA. Said amount of TMLA can theoretically be converted to 146.3 pounds of TMA.

EXAMPLE (A) Feed preparation

A $C_9$ aromatic hydrocarbon feedstock containing 98% by weight pseudocumene is air oxidized under liquid phase conditions in the presence of 350 weight parts of acetic acid containing 3% water and catalysis provided by sources of cobalt, manganese and bromine supplying 0.0074 gram atom total metal and 0.0158 gram atom bromine per mole of pseudocumene. The oxidation provides a total pseudocumene residence time of 63 minutes during which the temperature is increased from 370 to 410° F., pressure increases gradually from 130 p.s.i.g. to 265 p.s.i.g. over the first 37–38 minutes, more slowly from 265 to 275 p.s.i.g. over the next 15 minutes and quite rapidly from 275 to 340 p.s.i.g. in the last 10 minutes.

Fluid oxidation effluent at 410° F. and 350 p.s.i.g. contains for each 100 pounds $C_9$ hydrocarbon charged 160 pounds of TMLA and 395 pounds aqueous acetic acid solvent containing 13.9% water. Also present are the aromatic organic intermediate and co-product impurities.

(B) Solvent removal and recovery of crude TMA

The above 410° F. fluid oxidation effluent is charged with hereafter obtained liquid in discharge line 46 to heater 40 through its feed inlet 43 and discharge through its feed outlet 44 at 450° F. and flows through transfer line 45 line liquid-vapor separator 12 through inlet 11 of solvent stripper tower 10. The flow of said heated effluent is at a rate to provide said tower 10 with 160 pounds TMLA and 395 pounds aqueous (13.9% water) acetic acid per hour. Vapors rise from said bottom means 12 up through chimney 13 and liquid trapped by trap-out tray 14. Trapped liquid is withdrawn by pump 22 and its suction line 23 and a portion of the liquid discharged through transfer line 25 and spray-head 15 to spray-head 15 for scrubbing out of rising vapors materials boiling above TMA and prevent precipitation of TMA. The remainder of the discharged liquid flows through discharge line 45 back to heater 40 as above described. The rising vapors enter rectifier 16 where a reflux increasingly enriched in liquid TMA is formed and flows back to trap-out tray 14 and vapors of increasingly depleted TMA content exit top of rectification means 16, contact dephlegmation means 17 to provide acetic acid reflux to the top portion of rectification means 16 and the uncondensed vapors discharge through vapor outlet 19 of tower 10 to vapor transfer line 19a for transfer to acetic acid concentration (not shown). At steady state conditions 395 pounds of aqueous (13.9% water) acetic acid vapors together with 13.7 pounds of water vapor from TMA dehydration on an hourly basis flow through vapor outlet 19. Liquid portion of feed to bottom means 12 discharges through liquid discharge outlet 20 and flows down by transfer line 21 to liquid collection drum 30 initially containing a pool of liquid TMA at 480° F. Sump pump 37 removes a portion of the liquid from said drum 30 and discharges it through liquid transfer line and liquid inlet 53 of reboiler 50 which by indirect heat exchange heats said liquid to 525° F. for discharge through liquid exit 54 and transfer line 55 from which crude TMA steam is taken at an hourly rate to remove 146.3 pounds liquid TMA and the impurities associated therewith. High quality TMA, 135–140 pounds per hour, are recovered by the use of three vacuum distillation steps, not shown. The remainder of the 525° F. heated liquid returns to liquid collection drum 30 via its inlet 37 and transfer line 56. Vapors containing acetic acid vapors from said drum 30 rise through reflux condenser 31 cooled to condense TMA with hot water entering inlet 32 and exiting outlet 33. The uncondensed vapors leave reflux condenser 31 and flow through vapor conduit 34 into solvent stripper tower 10 above trap-out tray 14.

I claim:

1. A combination of apparatus for removing a mixture of acetic acid and water vapors and recovery of liquid crude intramolecular anhydride of trimellitic acid from a fluid mixture at elevated temperature containing vapors of acetic acid and water and a liquid acetic acid solution of trimellitic acid and impurities boiling above and below said anhydride, said combination comprising (a) a closed tower having in its lower portion a feed inlet to receive said fluid mixture, a vapor inlet above said feed inlet, a liquid discharge outlet in the bottom of the tower for removal of said liquid product and a vapor outlet at the top of the tower for exit therefrom of said mixture of vapors; (b) a liquid collection drum having a liquid inlet in communication with the liquid discharge outlet of said tower a second liquid inlet, a vapor space in direct contact with the surface of collected liquid, and a liquid discharge outlet; (c) means in communication with the liquid collection drum for heating the collected liquid above the boiling point of acetic acid whereby a portion of the heated liquid is vaporized to leave said liquid and pass into the vapor space of the liquid collection drum; (d) means in communication with the second liquid inlet of the liquid collection drum and with the vapor inlet of said tower for selective condensation from vapors in the vapor space of the liquid collection drum of vapors of said anhydride and higher boiling materials whereby the condensate flows into said collection drum and the remaining vapors pass into said tower through its vapor inlet; wherein said tower also has (1) dephlegmation means in its upper portion for condensing a portion of upwardly moving mixture of acetic acid and water vapors whereby the condensate flows downwardly in the tower as reflux and the uncondensed mixture of vapors exits through the vapor outlet in the top of the tower; (2) flow regulating means disposed between the vapor and fluid feed inlets of the tower for trapping a portion of downwardly flowing liquids, partitioning with the lower portion of the tower into a bottom means wherein fluid feed is separated into its vapor and liquid components and permitting only said separated vapor to rise through the trapped liquids and the untrapped liquids to continue flow downward into said bottom means; (3) a space above said flow regulation and portion means; means within said space for liquid scrubbing of vapors within said space; means for circulating trapped liquids to said scrubbing means; and rectification means in communication with said space and said dephlegmation means for enriching acetic acid content and depleting said anhydride content of the rising scrubbed vapors by contact within the rectification means of vapors rising therein and liquids flowing downwardly therethrough.

2. The combination of apparatus of claim 1 wherein the means for said heating of collected liquid is an internal heating coil within the liquid in the collection drum.

3. The combination of apparatus of claim 1 wherein the means for said heating of collected liquid is the combination of a reboiler and means for circulating said collected liquid through the reboiler from the liquid discharge outlet of and back to said collection drum and wherein said liquid anhydride product is withdrawn as a portion of the heated liquid returning to said collection drum.

4. The combination of apparatus of claim 3 having a fluid feed heater which has an inlet to receive the fluid feed, an outlet to discharge heated feed and conduit joining said outlet and the fluid feed inlet of the closed tower.

5. The combination of apparatus of claim 4 wherein the means disposed between the vapor and fluid feed inlets of the tower is a tray having at least one chimney in communication with the vapor in the bottom means and the vapor space above such disposed means.

6. The combination of apparatus of claim 5 wherein the vapor scrubbing means is a spray head.

References Cited
UNITED STATES PATENTS

| | | | |
|---|---|---|---|
| 3,484,458 | 12/1969 | Stein et al. | 260—346.4 |
| 3,191,916 | 6/1965 | Kurpit et al. | 202—158 |
| 3,258,486 | 6/1966 | Cook | 202—158 |
| 2,266,359 | 12/1941 | Edward | 202—153 |
| 3,589,984 | 6/1971 | Reid | 202—198 |
| 3,634,201 | 1/1972 | Kehse | 202—183 |
| 3,493,470 | 2/1970 | Irvin | 202—183 |
| 3,403,495 | 10/1968 | Jaasma | 203—42 |
| 3,105,748 | 10/1963 | Stahl | 203—42 |
| 3,061,622 | 10/1962 | Fiala | 203—42 |

WILBUR L. BASCOMB, JR., Primary Examiner

U.S. Cl. X.R.
202—158, 177, 198; 203—98

FO-1050
(5/69)

UNITED STATES PATENT OFFICE
CERTIFICATE OF CORRECTION

Patent No. 3,749,647        Dated July 31, 1973

Inventor(s) Donald G. Micklewright

It is certified that error appears in the above-identified patent and that said Letters Patent are hereby corrected as shown below:

The above mentioned patent has been proofread and the following errors noted:

Column 2, line 44:    following "340-380" -- psig -- was omitted
Column 2, line 57:    "and" should be -- or --.
Column 3, line 59:    "electric" should be -- eutectic --
Column 4, line 14:    following "within the space" -- in said tower 10 -- was omitted
Column 4, line 15:    following "tray 14" omit -- in said tower 10 -- which was incorrectly placed there
Column 4, line 26:    "exist" should be -- exits --
Column 4, line 36:    following "reflux" the word -- liquid -- was omitted
Column 4, line 59:    following "22" the phrase -- and conduits 23 and 25 -- was omitted
Column 4, line 70:    "exists" should be -- exits --
Column 4, line 73:    "exists" should be -- exits --
Column 5, line 33:    "TMA" should be --TMLA --
Column 5, line 35:    following "replacement" and preceding "50a" the word -- reboiler -- was omitted
Column 6, line 52:    "discharge" should be plural
Column 6, line 54:    "line" second occurrence should read -- into --.
Column 6, line 62:    "to" should be -- therefor --
Column 8, line 10: following "vapors" the word -- rising -- should be inserted.

Signed and sealed this 1st day of October 1974.

(SEAL)
Attest:

McCOY M. GIBSON JR.
Attesting Officer

C. MARSHALL DANN
Commissioner of Patents